United States Patent Office 3,578,669
Patented May 11, 1971

3,578,669
1-[(2 - SUBSTITUTED - 3 - INDOLYL) - LOWER-ALKANOYL] - CYCLOALKYL - LOWER-ALKYL-PIPERIDINES AND 1 - [(2 - HYDROXYMETHYL-3 - INDOLYL)-LOWER-ALKYL]-CYCLOALKYL-LOWER-ALKYLPIPERIDINES
Bernard L. Zenitz, Colonie, N.Y., assignor to Sterling Drug Inc., New York, N.Y.
No Drawing. Filed Sept. 16, 1969, Ser. No. 858,507
Int. Cl. C07d 29/30
U.S. Cl. 260—294                                17 Claims

ABSTRACT OF THE DISCLOSURE

Novel 1 - [(2 - substituted-3-indolyl)-lower-alkanoyl]-cycloalkyl - lower - alkylpiperidines and 1 - [(2-hydroxymethyl - 3 - indolyl) - lower - alkyl]-cycloalkyl-lower-alkylpiperidines having useful psychomotor depressant activity.

The present invention relates to novel 1-[(2-substituted-3-indolyl) - lower -alkanoyl] - cycloalkyl - lower - alkyl-piperidines and 1 - [(2 - hydroxymethyl-3-indolyl)-lower-alkyl] - cycloalkyl - lower - alkylpiperidines having the respective Formulas I and II:

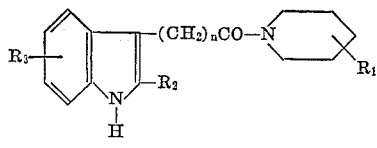

(I)

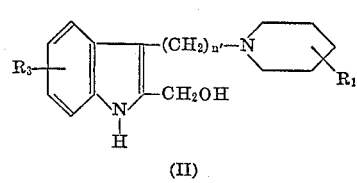

(II)

where $R_1$ is cycloalkyl-lower-alkyl; $R_2$ is carbo-lower-alkoxy, carboxy, carbamyl ($CONH_2$), N-lower-alkylcarbamyl, N,N-di-lower-alkylcarbamyl, or alkali metal salts of compounds where $R_2$ is carboxy; $R_3$ is hydrogen or methylenedioxy or ethylenedioxy attached to adjacent carbon atoms, or one or two of the same or different members of the group consisting of halogen, lower-alkyl, lower-alkoxy, lower-alkylmercapto, lower-alkylsulfinyl, lower-alklylsulfonyl, trifluoromethyl, benzyloxy, or hydroxy; $n$ is one of the integers 1 and 2; and $n'$ is one of the integers 2 and 3.

As used herein, the terms lower-alkyl and lower-alkoxy mean such groups which can be straight or branched and which contain from one to seven carbon atoms, and thus the lower-alkyl moiety of such lower-alkyl or lower-alkoxy groups represents, for example, methyl, ethyl, n-propyl, isopropyl, isobutyl, n-hexyl, and the like.

As used herein, the term cycloalkyl means cyclic saturated groups containing from three to seven ring carbon atoms, and thus represents cyclopropyl, cyclobutyl, cyclopentyl, cyclohexyl, and cycloheptyl.

The compounds of Formula I where $R_2$ is carbo-lower-alkoxy and $n$ is 2 are prepared in a series of reactions comprising (1) reaction of a benzenediazonium chloride with a 2-carbo-lower-alkoxycyclopentanone; (2) reaction of the resulting lower-alkyl adipate half ester α-keto-phenylhydrazone with isobutyl chloroformate in acetone in the presence of triethylamine followed by treatment of the resulting mixed anhydride with an appropriate cyclo-alkyl - lower - alkylpiperidine; and (3) cyclization under Fischer indole synthesis conditions of the resulting lower-alkyl adipate half ester piperidide α-ketophenylhydrazone. The reactions are represented by the following equations:

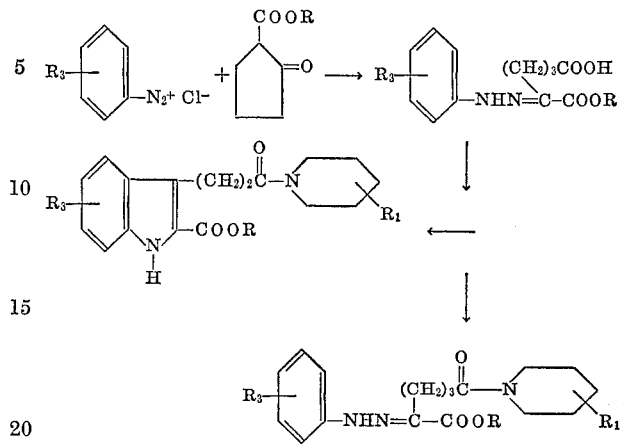

where $R_1$ and $R_3$ have the meanings given above, and R is loweralkyl.

The compounds of Formula I where $R_2$ is carbo-lower-alkoxy and $n$ is 1 are prepared by reaction of a 1-(α-halo-acetyl)-$R_1$-piperidine with the Grignard reagent prepared by reaction of a lower-alkylmagnesium halide with an appropriate $R_3$-2-carbo-lower-alkoxyindole. The method is represented by the following reactions where R, $R_1$, and $R_3$ have the meanings given above, R' represents lower-alkyl, and X represents halogen:

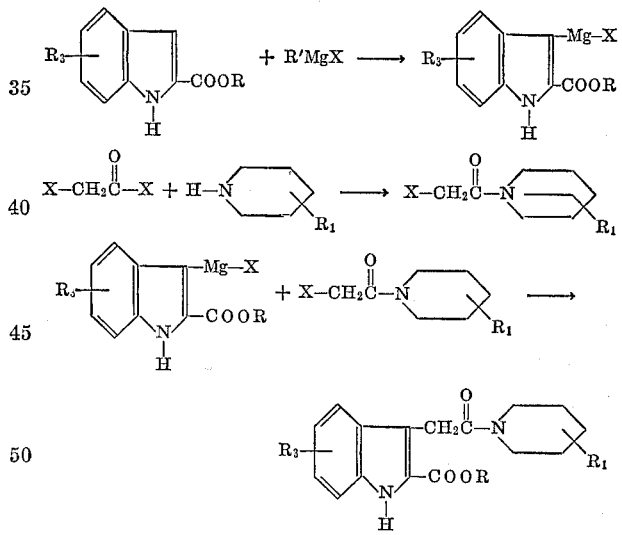

The compounds of Formula I where $R_2$ is carboxy are prepared by alkaline hydrolysis of the corresponding compounds where $R_2$ is carbo-lower-alkoxy. The reaction is preferably carried out either in an aqueous or an aqueous-alcoholic medium at the reflux temperature thereof and in the presence of an alkali metal hydroxide. If desired, the compounds can be isolated from the alkaline reaction medium to produce the alkali metal salts of the compounds where $R_2$ is carboxy.

The compounds of Formula I where $R_2$ is carbamyl, N-lower-alkylcarbamyl, or N,N-di-lower-alkylcarbamyl, are prepared by reacting the corresponding compounds where $R_2$ is carbo-lower-alkoxy with anhydrous ammonia, a lower-alkylamine [e.g. methyl-amine ($CH_3NH_2$), ethyl-amine ($C_2H_5NH_2$), or 2-pentylamine ($CH_3CH_2CH_2CHCH_3NH_2$)]

or a di-lower-alkylamine {e.g. dimethylamine

[($CH_3$)$_2NH$]

methylethylamine ($CH_3NHC_2H_5$), or methylpentylamine ($CH_3NHC_5H_{11}$)}, respectively. The reaction is preferably carried out in a lower-alkanol solvent at temperatures in the range from about 20° C. to around 150° C. If desired, the reaction can be carried out under pressure in an autoclave.

The compounds of Formula II are prepared by reducing the compounds of Formula I where $R_2$ is carboxy or carbo-lower-alkoxy with an alkali metal aluminum hydride. The reaction is preferably carried out in an organic solvent inert under the conditions of the reaction, for example diethyl ether, tetrahydrofuran, dibutyl ether, and the like, at temperatures in the range from 0–100° C. Thus the compounds of Formula I, in addition to having useful pharmacodynamic properties of a nature to be described hereinbelow, are also useful as intermediates for the preparation, not only of the corresponding compounds of Formula I where $R_2$ is carboxy, carbamyl, N-lower-alkylcarbamyl, or N,N-di-lower-alkylcarbamyl, but are also useful as intermediates for the preparation of the compounds of Formula II.

The acid-addition salts of the bases herein described are the form in which the bases are most conveniently prepared for use. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. Appropriate pharmacologically acceptable salts within the scope of the invention are those derived from mineral acids such as hydrobromic acid, hydriodic acid, nitric acid phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate, and quinate, respectively.

Although pharmacologically acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically acceptable salt by ion-exchange procedures.

Pharmacological evaluation of the compounds of Formulas I and II according to standard pharmacological test procedures has demonstrate that they possess psychomotor depressant activity thus indicating their usefulness as tranquilizers.

Psychomotor depressant activity was determined in standard activity cages using the method of Dews, Brit J. Pharmacol. 8, 46 (1953) in which mice, medicated with the test compound, are placed in wire mesh cages equipped with a photoelectric cell so adjusted that a mouse breaking the beam activates a magnetic digital counter. Thus the number of times the light beam is broken over a period of time is an indication of the motor activity of the animals, and a reduction in the number of counts in the medicated mice over control groups, run simultaneously, is taken as evidence of psychomotor depressant activity. The dose at which such reduction in motor activity was observed was recorded as the active-dose. Alternatively, the $ED_{50}$, the effective dose in 50% of the animals, is determined from a dose-response curve.

Instead of determining the motor activity of the test animals using a digital counter activated by a photoelectric cell, there can also be used a counting apparatus such as described by Bonta et al., Arch. int. pharmacodyn. 129, 381–394 (1960) in which vertically movable leaf springs affixed to the activity cages activate a direct current ampere hour meter which serves as a counter of the recorded activity. Moreover, as these authors show, compounds which depress motor activity of mice in such activity cages are indicated to possess tranquilizer activity.

The compounds of the invention, when administered orally to mice in the above-described psychomotor activity test, were found to be active in the dose range of from 8 to 300 mg./kg. of body weight.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration either alone or in combination with suitable adjuvants such as calicum carbonate, starch, lactose, talc, magnesium stearate, gum acacia, and the like. Still further the compounds can be formulated for oral administration in aqueous alcohol, glycol or oil solutions, or oil-water emulsions in the same manner as conventional medicinal substances are prepared.

The chemical structures of the compounds of the invention are established by their mode of synthesis and are corroborated by infrared and ultraviolet spectra, and by the correspondence between calculated values for the elements and values found by chemical analysis.

The following examples will further illustrate specific embodiments of the invention.

EXAMPLE 1

(A) 1-[β-(2carbethoxy-5-methoxy-3-indolyl)propionyl]-2-cyclohexylmethylpiperidine A solution of 30.7 g. (0.25 mole) of 4-methoxyaniline in 60 ml. of concentrated hydrochloric acid and 900 ml. of water was stirred and cooled to 0° C. and then treated while stirring and cooling with a solution of 18 g. (0.26 mole) of sodium nitrite in 50 ml. of water. When addition was complete, the solution was stirred at 0–5° C. for another 10 minutes, and then treated simultaneously with a solution of 100 g. of sodium acetate in 150 ml. of water and a solution of 40.6 g. (0.26 mole) of 2 carbethoxycyclopentanone in 50 ml. of ethanol. A yellow oil separated immediately which, on continued stirring for another one and a half hours, gradually turned dark green. The mixture was extracted with benzene, and the benzene extracts were washed two times with water, two times with saturated bicarbonate solution, and dried. Removal of the solvent in vacuo gave an oil which was dissolved in 100 ml. of ethanol and added to a stirred solution of 30 g. of sodium carbonate in 500 ml. of water. The aqueous solution was decanted from a small amount of a black insoluble oil, and the aqueous solution washed with hexane and then acidified with 75 ml. of glacial acetic acid. The yellow crystals of crude ethyl adipate half ester α-keto - 4 - methoxyphenylhydrazone were collected, washed with water, and dried giving 55.5 g. of the hydrazone.

The latter (15.4 g., 0.05 mole) was dissolved in 250 ml. of acetone containing 5.5 g. (0.05 mole) of triethylamine, the solution was cooled to 10° C., and treated with a solution of 6.83 g. (0.05 mole) of 2-cyclohexylmethyl-piperidine in 175 ml. of acetone. The reaction mixture was then taken to dryness, the residue was dissolved in benzene and the organic layer extracted twice with dilute hydrochloric acid, once with water, and four times with dilute sodium carbonate. The organic solution was then dried and taken to dryness in vacuo to give 22.8 g. of a dark colored viscous oil consisting of the crude adipamide α-keto-4-methoxyphenylhydrazone.

The latter was dissolved in 114 ml. of absolute ethanol and treated with 11 ml. of concentrated sulfuric acid. The resulting black solution was heated under reflux for three hours and evaporated to dryness in vacuo. The residue was dissolved in 1500 ml. of ether, the ether solution was washed once with ice water, three times with dilute sodium carbonate solution, three times again with water and then dried, filtered, and the filtrate taken to dryness in vacuo to give 10.8 g. of crude product. The latter was recrystallized from an ethanol/hexane mixture to give 2.6 g. of 1-[β(2-carbethoxy-5-methoxy - 3 - indolyl)propionyl]-2-cyclohexylmethylpiperidine, M.P. 170.5–172° C. (uncorr.).

(B) 1-[β-(2-carboxy-5-methoxy-3-indolyl)propionyl]-2-cyclohexylmethylpiperidine

1 - [β - (2 -carbethoxy - 5 - methoxy - 3 -indolyl)propionyl]-2-cyclohexylmethylpiperidine (5.3 g., 0.01 mole) was dissolved in 35 ml. of hot ethanol, and the hot solution treated with 13.5 ml. of a 1 N solution of sodium hydroxide. The clear solution was refluxed for twenty minutes, then cooled, diluted with 200 ml. of water, extracted with 300 ml. of ether, and then acidified with 10 ml. of glacial acetic acid. The solid which separated was collected, dried, and recrystallized from ethanol to give 4.1 g. of 1-[β-(2-carboxy-5-methoxy-3-indolyl) - propionyl]-2-cyclohexylmethylpiperidine, M.P. 211–212° C.

(C) 1-{β-[2-(N-methylcarbamyl)-5-methoxy-3-indolyl]propionyl}-2-cyclohexylmethylpiperidine A mixture of 7.0 g. of 1-[β-(2-carbethoxy-5-methoxy-3-indolyl)propionyl]-2-cyclohexylmethylpiperidine in 80 ml. of ethanol containing 1.5 g. of methylamine was placed in an autoclave and heated under pressure at 120° C. for twenty hours. The mixture was then cooled to room temperature, evaporated to dryness, the residue dissolved in hot ethanol, the solution charcoaled, and then diluted with hot boiling hexane. The solid which separated was collected and recrystallized from ethanol giving 6.8 of 1-{β-[2 - (N-methylcarbamyl) - 5 - methoxy-3-indolyl]propionyl} - 2 - cyclohexylmethylpiperidine, M.P. 164.5–166° C. (uncorr.).

(D) 1-[3-(2-hydroxymethyl-5-methoxy-3-indolyl)propyl]-2-cyclohexylmethylpiperidine A solution of 8.5 g. (0.02 mole) of 1-[β-(2-carbethoxy-5-methoxy-3-indolyl)propionyl] - 2 - cyclohexylmethylpiperidine dissolved in 150 ml. of dry tetrahydrofuran was added over a period of about thirty minutes to a stirred slurry of 3.04 g. (0.08 mole) of lithium aluminum hydride in 150 ml. of tetrahydrofuran. The mixture was stirred at room temperature for about twelve hours, and then cooled in an ice/water bath and treated cautiously with stirring with a solution of 6.5 ml. of water in 30 ml. of tetrahydrofuran. The resulting mixture was stirred for thirty minutes, filtered, the filter cake washed with tetrahydrofuran, and the combined filtrates evaporated to dryness in vacuo to give 7.9 g. of a cloudy oil which solidified on cooling. The latter was recrystallized from hexane to give 6.5 g. of 1-[3-(2-hydroxymethyl - 5 - methoxy-3-indolyl)propyl]-2-cyclohexylmethylpiperidine, M.P. 110.5–112° C. (uncorr.).

EXAMPLE 2

(A) 1 - [β - (2-carbomethoxy - 3 - indolyl)propionyl]-4 - cyclohexylmethylpiperidine, M.P. 142.0–143.5° C. (uncorr.) (recrystallized from ethyl acetate/hexane) is prepared by reaction of benzenediazonium chloride with 2-carbomethoxycyclopentanone, conversion of the resulting methyl adipate half ester α-ketophenylhydrazone to the corresponding 2-cyclohexylmethylpiperidine, and Fischer indole cyclization of the latter in the presence of mineral acid, all according to the procedure described above in Example 1–A.

(B) 1-[β-(2-carboxy - 3 - indolyl)propionyl]-4-cyclohexylmethylpiperidine is prepared by alkaline saponification of 1-[β-(2-carbomethoxy - 3 - indolyl)propionyl]-4-cyclohexylmethylpiperidine, using the procedure described above in Example 1–B.

(C) 1- {β -[2 - (N-methylcarbamyl)-3-indoyl]propionyl}-4-cyclohexylmethylpiperidine, M.P. 173.0–174.5° C. (uncorr.) (recrystallized from benzene) is prepared by reaction of 1-[β-(2-carbethoxy - 3 - indolyl)propionyl]-4-cyclohexylmethylpiperidine with methylamine using the procedure described above in Example 1–C.

(D) 1-[3-(2-hydroxymethyl - 3 - indolyl)propyl]-4-cyclohexylmethylpiperidine, M.P. 150.0–151.0° C. (recrystallized from an ethyl acetate/hexane mixture) is prepared by lithium aluminum hydride reduction in tetrahydrofuran of 1-[β-(2-carbomethoxy - 3 - indolyl)propionyl]-4-cyclohexylmethylpiperidine using the procedure described above in Example 1–D.

EXAMPLE 3

(A) 1-[β-(2-carbethoxy - 5,7 - difluoro-3-indolyl)propionyl]-2-cyclohexylmethylpiperidine, M.P. 120.0–122.0° C. (uncorr.) (recrystallized from an ethyl acetate/hexance mixture) is prepared by reaction of 2,4-difluorobenzediazonium chloride with 2-carbethoxycyclopentanone, conversion of the resulting ethyl adipate half ester α-keto-2,4-difluorophenylhydrazone to the corresponding 2-cyclohexylmethylpiperidine, and cyclization of the latter under Fischer indole cyclization conditions, all according to the procedure described above in Example 1–A.

(B) 1-[β-(2-carboxy - 5,7 - difluoro-3-indolyl)propionyl-2-cyclohexylmethylpiperidine, M.P. 195.5–197.5° C. (uncorr.) (recrystallized from ethyl acetate/hexane) is prepared by alkaline saponification of 1-[β-(2-carbethoxy-5,7-difluoro - 3 - indolyl)propionyl]-2-cyclohexylmethylpiperidine using the procedure described above in Example 1–B.

(C) 1-{β-(2 - (N-methylcarbamyl) - 5,7 - difluoro-3-indolyl]propionyl} - 2 - cyclohexylmethylpiperidine, M.P. 169.5–171° C. (uncorr.) (recrystallized from methanol) is prepared by reaction of 1-[β-(2-carbethoxy - 5,7 - difluoro-3-indolyl)propionyl] - 2 - cyclohexylmethylpiperidine with methylamine using the manipulative procedure described above in Example 1–C.

(D) 1-[3-(2-hydroxymethyl - 5,7 - difluoro-3-indolyl)propyl]-2-cyclohexylmethylpiperidine is prepared by lithium aluminium hydride reduction in tetrahydrofuran of 1-[β-(2-carbethoxy - 5,7 - difluoro-3-indolyl)propionyl]-2-cyclohexylmethylpiperidine using the procedure described above in Example 1–D.

EXAMPLE 4

(A) 1-[β-(2-carbomethoxy - 5 - methoxy-3-indolyl)propionyl]-4-cyclohexylmethylpiperidine, M.P. 156–158° C. (uncorr.) (recrystallized from benzene/hexane) is prepared by reaction of 4 - methoxybenzenediazonium chloride with 2-carbomethoxycyclopentanone, conversion of the resulting methyl adipate half ester α-keto-4-methoxyphenylhydrazone to the corresponding 4-cyclohexylmethylpiperidide, and Fischer indole cyclization ofthe latter in the presence of mineral acid, all according to the procedure described above in Example 1–A.

(B) 1-[β-(2-carboxy-5-methoxy - 3 - indolyl)propionyl]-4-cyclohexylmethylpiperidine is prepared by alkaline saponification of 1-[β-(2-carbomethoxy - 5 - methoxy-3-indolyl)propionyl] - 4 - cyclohexylmethylpiperidine using the procedure described above in Example 1–B.

(C) 1 - {β-[2-N-isopropylcarbamyl) - 5 - methoxy-3-indolyl]propionyl} - 4 - cyclohexylmethylpiperidine is prepared by reaction of 1-[β-(2-carbomethoxy-5-methoxy-3 - indolyl)propionyl] - 4 - cyclohexylmethylpiperidine with isopropylamine using the procedure described above in Example 1–C.

(D) 1-[3-(2-hydroxymethyl - 5 - methoxy-3-indolyl)propyl]-4-cyclohexylmethylpiperidine, M.P. 155.5–156.2° C. (uncorr.) (recrystallized from ethyl acetate/hexane) is prepared by lithium aluminum hydride reduction in tetrahydrofuran of 1-[β-(2-carbomethoxy - 5 - methoxy-3- indolyl)propionyl] - 4 - cyclohexylmethylpiperidine using the procedure described above in Example 1–D.

EXAMPLE 5

(A) 1 - [β-(2-carbomethoxy-5-fluoro-3-indolyl)propionyl]-4-cyclohexylmethylpiperidine, M.P. 158–159° C. (uncorr.) (recrystallized from benzene/hexane) is prepared by reaction of 4-fluorobenzenediazonium chloride with 2-carbomethoxycyclopentanone, conversion of the resulting methyl adipate half ester α-keto-4-fluorophenylhydrazone to the corresponding 4-cyclohexylmethylpiperidide, and Fischer indole cyclization of the latter in the presence of mineral acid, all according to the procedure described above in Example 1–A.

(B) 1 - [β - (2-carboxy-5-fluoro-3-indolyl)propionyl]-4-cyclohexylmethylpiperidine is prepared by alkaline saponification of 1-[β-(2-carbomethoxy-5-fluoro-3-indolyl)propionyl]-4-cyclohexylmethylpiperidine using the procedure described above in Example 1–B.

(C) 1 - {β-[2-(N-methylcarbamy)-5-fluoro-3-indolyl]propionyl}-4-cyclohexylmethylpiperidine is prepared by reaction of 1-[β-(2-carbomethoxy-5-fluoro-3-indolyl)propionyl]-4-cyclohexylmethylpiperidine with ethylamine using the procedure described above in Example 1–C.

(D) 1 - [3 - (2-hydroxymethyl-5-fluoro-3-indolyl)propyl]-4-cyclohexylmethylpiperidine is prepared by lithium aluminum hydride reduction in tetrahydrofuran of 1-[β-(2-carbomethoxy-5-fluoro-3-indolyl)propionyl] - 4 - cyclohexylmethylpiperidine using the procedure described above in Example 1–D.

EXAMPLE 6

(A) 1 - [β - (2-carbobutoxy-5,6-methylenedioxy-3-indolyl)propionyl]-3-cyclopentylmethylpiperidine is prepared by reaction of 3,4-methylenedioxybenzenediazonium chloride with 2-carbobutoxycyclopentanone, conversion of the resulting butyl adipate half ester α-keto-3,4-methylenedioxyphenylhydrazone to the corresponding 3-cyclopentylmethylpiperidide, and Fischer indole cyclization of the latter in the presence of mineral acid, all according to the procedure described above in Example 1–A. The 3-cyclopentylmethylpiperidine required as an intermediate is in turn prepared by reaction of cyclopentylmethyl magnesium chloride with 3-piperidone, dehydration of the resulting carbinol with phosphorus oxychloride in pyridine, and reduction of the resulting 3-cyclopentylmethyltetrahydropyridine derivative with hydrogen over palladium-on-charcoal.

(B) 1 - [β - (2-carboxy-5,6-methylenedioxy-3-indolyl)propionyl]-3-cyclopentylmethylpiperidine is prepared by alkaline saponification of 1-[β-(2-carbobutoxy-5,6-methylenedioxy-3-indolyl)propionyl] - 3 - cyclopentylmethylpiperidine using the procedure described above in Example 1–B.

(C) 1 - [β-(2-carbamyl-5,6-methylenedioxy-3-indolyl)propionyl]-3-cyclopentylmethylpiperidine is prepared by reaction of 1 - [β - (2-carbobutoxy-5,6-methylenedioxy-3-indolyl)propionyl] - 3 - cyclopentylmethylpiperidine with anhydrous ammonia in ethanol using the procedure described above in Example 1–C.

(D) 1 - [3 - (2-hydroxymethyl-5,6-methylenedioxy-3-indolyl)propyl] - 3 - cyclopentylmethylpiperidine is prepared by lithium aluminum hydride reduction in tetrahydrofuran of 1 - [β - (2 - carbobutoxy - 5,6 - methylin tetrahydrofuran of 1 - [β-(2-carbobutoxy-5,6-methylenedioxy - 3 - indolyl)propionyl] - 3 - cyclopentylmethylpiperidine using the procedure described above in Example 1–D.

EXAMPLE 7

(A) 1-[α-(2-carbethoxy-5,6-ethylenedioxy - 3 - indolyl)acetyl] - 4 - (2-cyclopropylethyl)piperidine is prepared by reaction of 2-carbethoxy-5,6-ethylenedioxyindole magnesium bromide (prepared from 2-carbethoxy-5,6-ethylenedioxyindole with methyl magnesium bromide) with 1-(α - chloroacetyl) - 4 - (2-cyclopropylethyl)piperidine. The latter is prepared by reaction of 2-cyclopropylethyl chloride with 4-piperidone, dehydration of the resulting carbinol with phosphorus oxychloride in pyridine, and reduction of the resulting 4-(2-cyclopropylethyl)-tetrahydropyridine with hydrogen over a palladium-on-charcoal catalyst, and reaction of the 4-(2-cyclopropylethyl)piperidine with α-chloroacetyl chloride in the presence of sodium carbonate.

(B) 1 - [α - (2-carboxy-5,6-ethylenedioxy-3-indolyl)acetyl] - 4 - (2-cyclopropylethyl)piperidine is prepared by alkaline saponification of 1-[α-(2-carbethoxy-5,6-ethylenedioxy-3-indolyl)acetyl] - 4 - (2-cyclopropylethyl)piperidine, using the procedure described above in Example 1–B.

(C) 1 - {α - [2-(N,N-dimethylcarbamyl)-5,6-ethylenedioxy - 3 - indolyl]acetyl} - 4-(2 - cyclopropylethyl)piperidine is prepared by reaction of 1-[α-(2-carbethoxy-5,6-ethylenedioxy-3-indolyl)acetyl] - 4 - (2-cyclopropylethyl)piperidine with dimethylamine in ethanol using the procedure described above in Example 1–C.

(D) 1 - [2 - (2 - hydroxymethyl-5,6-ethylenedioxy-3-indolyl)ethyl] - 4 - (2-cyclopropylethyl)piperidine is prepared by lithium aluminum hydride reduction in tetrahydrofuran of 1 - [α - (2-carbethoxy-5,6-ethylenedioxy-3-indolyl)acetyl] - 4 - (2-cyclopropylethyl)piperidine, using the procedure described above in Example 1–D.

EXAMPLE 8

(A) 1-[α-(2-carbethoxy - 5 - benzyloxy-3-indolyl)acetyl] - 4 - cyclohexylmethylpiperidine is prepared by reaction of 2-carbethoxy-5-benzyloxyindole magnesium bromide (prepared by reaction of 2-carbethoxy-5-benzyloxyindole with methyl magnesium bromide) with 1-(α-chloroacetyl)-4-cyclohexylmethylpiperidine. The latter is prepared by reaction of 4-cyclohexylmethylpiperidine with α-chloroacetyl chloride in the presence of sodium carbonate.

(B) 1 - [α - (2-carboxy-5-benzyloxy-3-indolyl)acetyl] 4 - cyclohexylmethylpiperidine is prepared by alkaline saponification of 1 - [α-(2-carbethoxy-5-benzyloxy-3-indolyl)acetyl]-4-cyclohexylmethylpiperidine, using the procedure described above in Example 1–B.

(C) 1 - {α - [2-(N,N-diethylcarbamyl)-5-benzyloxy-3-indolyl]acetyl} - 4 - cyclohexylmethylpiperidine is prepared by reaction of 1 - [α - (2-carbethoxy-5-benzyloxy-3-indolyl)acetyl] - 4 - cyclohexylmethylpiperidine with diethylamine in ethanol using the procedure described above in Example 1–C.

(D) 1 - [2 - (2-hydroxymethyl-5-benzyloxy-3-indolyl)ethyl] - 4 - cyclohexylmethylpiperidine is prepared by lithium aluminum hydride reduction in tetrahydrofuran of 1 - [α - (2-carbethoxy-5-benzyloxy-3-indolyl)acetyl]-4-cyclohexylmethylpiperidine using the procedure described above in Example 1–D.

EXAMPLE 9

(A) 1-[β-(2-carbethoxy - 5 - hydroxy-3-indolyl)propionyl]-4-cyclohexylmethylpiperidine is prepared by reaction of 4-hydroxybenzenediazonium chloride with 2-carbethoxycyclopentanone, conversion of the resulting ethyl adipate half ester α-keto-4-hydroxyphenylhydrazone to the corresponding 4-cyclohexylmethylpiperidide, and Fischer indole cyclization of the latter in the presence of mineral acid, all according to the procedure described above in Example 1–A.

(B) 1[β-(2-carboxy - 5 - hydroxy-3-indolyl)proponyl]-4-cyclohexylmethylpiperidine is prepared by alkaline saponification of 1-[β-(2-carbethoxy-5-hydroxy-3-indolyl) propionyl]-4-cyclohexylmethylpiperidine using the procedure described above in Example 1–B.

(C) 1-{β-[2-(N-methylcarbamyl) - 5 - hydroxy-3-indolyl]propionyl}-4-cyclohexylmethylpiperidine is prepared by reaction of 1-[β-(2-carbethoxy-5-hydroxy-3-indolyl) propionyl]-4-cyclohexylmethylpiperidine with methylamine in ethanol using the procedure described above in Example 1–C.

(D) 1-[3-(2-hydroxymethyl - 5 - hydroxy-3-indolyl) propyl]-4-cyclohexylmethylpiperidine is prepared by lithium aluminum hydride reduction in tetrahydrofuran of 1-[]O-(2-carbethoxy - 5 - hydroxy-3-indolyl)propionyl]-4-cyclohexylmethylpiperidine using the procedure described above in Example 1–D.

EXAMPLE 10

(A) 1-[β-(2-carbethoxy - 5,6 - dimethoxy-3-indolyl) propionyl]-4-cyclohexylmethylpiperidine is prepared by reaction of 3,4-dimethoxybenzenediazonium chloride with 2-carbethoxycyclopentanone, conversion of the resulting ethyl adipate half ester α-keto-3,4-dimethoxyphenylhydrazone to the corresponding 4-cyclohexylmethylpiperidide, and Fischer indole cyclization of the latter in the presence of mineral acid, all according to the procedure described above in Example 1–A.

(B) 1-[β-(2-carboxy-5,6-dimethoxy - 3 - indolyl)propionyl]4-cyclohexylmethylpiperidine is prepared by alkaline saponification of 1-[β-(2-carbethoxy-5,6-dimethoxy-3-indolyl)propionyl]-4-cyclohexylmethylpiperidine using the procedure described above in Example 1–B.

(C) 1-[β-(2-carbamyl - 5,6 - dimethoxy-3-indolyl)propionyl]-4-cyclohexylmethylpiperidine is prepared by reaction of 1-[β - (2-carbethoxy-5,6-dimethoxy-3-indolyl)propionyl]-4-cyclohexylmethylpiperidine with anhydrous ammonia in ethanol using the procedure described above in Example 1–C.

(D) 1-[3-(2 - hydroxymethyl - 5,6 - dimethoxy-3-indolyl)propyl]-4-cyclohexylmethylpiperidine is prepared by lithium aluminum hydride reduction in tetrahydrofuran of 1-[β-(2-carbethoxy-5,6-dimethoxy - 3 - indolyl)propionyl]-4-cyclohexylmethylpiperidine using the procedure described above in Example 1–D.

EXAMPLE 11

(A) 1-{β-[2-carbethoxy - 4,6 - di-(trifluoromethyl)-3-indolyl]propionyl}-4-cyclohexylmethylpiperidine is prepared by reaction of 3,5-di-(trifluoromethyl)benzenediazonium chloride with 2-carbethoxycyclopentanone, conversion of the resulting ethyl adipate half ester α-keto-3,5-di-(trifluoromethyl)phenylhydrazone to the corresponding -4-cyclohexylmethylpiperidine, and Fischer indole cyclization of the latter in the presence of mineral acid, all according to the procedure described above in Example 1–A.

(B) 1-{β-[2-carboxy - 4,6 - di-(trifluoromethyl)-3-indolyl]propionyl}-4-cyclohexylmethylpiperidine is prepared by alkaline saponification of 1-{β-[2-carbethoxy-4,6-di-(trifluoromethyl)-3-indolyl]propionyl} - 4 - cyclohexylmethylpiperidine using the procedure described above in Example 1–B.

(C) 1-{β-[2 - carbamyl - 4,6 - di-(trifluoromethyl)-3-indolyl]propionyl} - 4 - cyclohexylmethylpiperidine is prepared by reaction of 1-{β-[2-carbethoxy-4,6-di-(trifluoromethyl)-3-indolyl]propionyl} - 4-cyclohexylmethylpiperidine with anhydrous ammonia in ethanol using the procedure described above in Example 1–C.

(D) 1-{3-[2-hydroxymethyl - 4,6-di-(trifluoromethyl)-3 - indolyl]propyl}-4-cyclohexylmethylpiperidine is prepared by lithium aluminum hydride reduction in tetrahydrofuran of 1-{β-[2-carbethoxy - 4,6-di-(trifluoromethyl)-3 - indolyl]propionyl} - 4 - cyclohexylmethylpiperidine using the procedure described above in Example 1–D.

EXAMPLE 12

(A) 1-[β-(2-carbethoxy - 5 - methoxy-6-bromo-3-indolyl)propionyl] - 4 - cyclohexylmethylpiperidine is prepared by reaction of 3-bromo-4-methoxybenzenediazonium chloride with 2-carbethoxycyclopentanone, conversion of the resulting ethyl adipate half ester α-keto-3-bromo-4-methoxyphenylhydrazone to the corresponding 4-cyclohexylmethylpiperidide, and Fischer indole cyclization of the latter in the presence of mineral acid, all according to the procedure described above in Example 1–A.

(B) 1-[β-(2-carboxy - 5 - methoxy-6-bromo-3-indolyl) propionyl]-4-cyclohexylmethylpiperidine is prepared by alkaline saponification of 1-[β-(2-carbethoxy-5-methoxy-6-bromo-3-indolyl)propionyl] - 4 - cyclohexylmethylpiperidine using the procedure described in Example 1–B.

(C) 1-[β -(2-carbamyl - 5 - methoxy-6-bromo-3-indolyl)propionyl] - 4 - cyclohexylmethylpiperidine is prepared by reaction of 1-[β-(2 - carbethoxy-5-methoxy-6-bromo-3-indolyl)propionyl] - 4 - cyclohexylmethylpiperidine with anhydrous ammonia in ethanol using the procedure described above in Example 1–C.

(D) 1-[3-(2-hydroxymethyl - 5 - methoxy-6-bromo-3-indolyl)propyl] - 4 - cyclohexylmethylpiperidine is prepared by lithium aluminum hydride reduction in tetrahydrofuran of 1-[β-(2-carbethoxy - 5 - methoxy-6-bromo-3 - indolyl)propionyl]-4-cyclohexylmethylpiperidine using the procedure described above in Example 1–D.

EXAMPLE 13

(A) 1-[β-(2-carbethoxy-5 - methyl-7-chloro-3-indolyl) propionyl] - 4 - cyclohexylmethylpiperidine is prepared by reaction of 2-chloro-4-methylbenzenediazonium chloride with 2-carbethoxycyclopentanone, conversion of the resulting ethyl adipate half ester α-keto-2-chloro-4-methylphenylhydrazone to the corresponding 4-cyclohexylmethylpiperidide, and Fischer indole cyclization of the latter in the presence of mineral acid, all according to the procedure described above in Example 1–A.

(B) 1-[β-(2-carboxy - 5 - methyl-7-chloro-3-indolyl) propionyl]-4-cyclohexylmethylpiperidine is prepared by alkaline saponification of 1-[β-(2-carbethoxy-5-methyl-7-chloro - 3 - indolyl)propionyl]-4-cyclohexylmethylpiperidine using the procedure described above in Example 1–B.

(C) 1-[β-(2-carbamyl - 5 - methyl-7-chloro-3-indolyl) propionyl]-4-cyclohexylmethylpiperidine is prepared by reaction of 1-[β-(2-carbethoxy-5-methyl-7-chloro-3-indolyl)propionyl]-4-cyclohexylmethylpiperidine with anhydrous ammonia in ethanol using the procedure described above in Example 1–C.

(D) 1-[3-(2-hydroxymethyl - 5 - methyl-7-chloro-3-indolyl)propyl] - 4 - cyclohexylmethylpiperidine is prepared by lithium aluminum hydride reduction of 1-[β-(2-carbethoxy - 5 - methyl-7-chloro-3-indolyl)propionyl]-4-cyclohexylmethylpiperidine using the procedure described above in Example 1–D.

EXAMPLE 14

(A) 1 - [β(2-carbethoxy-5-methylmercapto-3-indolyl) propionyl]-4-cyclohexylmethylpiperidine is prepared by reaction of 4-methylmercaptobenzenediazonium chloride with 2-carbethoxycyclopentanone, conversion of the resulting ethyl adipate half ester α-keto-4-methylmercaptophenylhydrazone to the corresponding 4-cyclohexylmethylpiperidide, and Fischer indole cyclization of the latter in the presence of mineral acid, all according to the procedure described above in Example 1–A.

(B) 1 - [β - (2 - carboxy-5-methylmercapto-3-indolyl) propionyl]-4-cyclohexylmethylpiperidine is prepared by alkaline saponification of 1-[β-(2-carbethoxy-5-methylmercapto-3-indolyl)propionyl]-4 - cyclohexylmethylpiperidine using the procedure described above in Example 1–B.

(C) 1 - [β - 2 - carbamyl-5-methylmercapto-3-indolyl) propionyl]-4-cyclohexylmethylpiperidine is prepared by reaction of 1 - [β - (2-carbethoxy-5-methylmercapto-3-indolyl)propionyl]-4-cyclohexylmethylpiperidine with anhydrous ammonia in absolute ethanol using the procedure described above in Example 1–C.

(D) 1 - [3 - (2 - hydroxymethyl-5-methylmercapto-3-indolyl propyl]-4-cyclohexylmethylpiperidine is prepared by lithium aluminum hydride reduction in tetrahydrofuran of 1 - [β - (2 - carbethoxy-5-methylmercapto-3-indolyl)-propionyl]-4-cyclohexylmethylpiperidine using the procedure described above in Example 1–D.

EXAMPLE 15

(A) 1 - [β - (2 - carbethoxy-5-methylsulfinyl-3-indolyl)propionyl]-4-cyclohexylmethylpiperidine is prepared by the reaction of 4-methylsulfinylbenzenediazonium chloride with 2-carbethoxycyclopentanone, conversion of the resulting ethyl adipate half ester α-keto-4-mehtylsulfinylphenylhydrazone to the corresponding 4-cyclohexylmethylpiperidide, and Fischer indole cyclization of the latter in the presence of mineral acid, all according to the procedure described above in Example 1–A.

(B) 1 - [β - (2 - carboxy-5-methylsulfinyl-3-indolyl)propionyl]-4-cyclohexylmethylpiperidine is prepared by alkaline saponification of 1-[β-(2-carbethoxy-5-methylsulfinyl-3-indolyl)propionyl] - 4 - cyclohexylmethylpiperidine using the procedure described above in Example 1-B.

(C) 1 - [β - (2 - carbamyl-5-methylsulfinyl-3-indolyl)propionyl]-4-cyclohexylmethylpiperidine is prepared by reaction of 1-[β-(2-carbethoxy-5-methylsulfinyl-3-indolyl)propionyl]-4-cyclohexylmethylpiperidine with anhydrous ammonia in ethanol using the procedure described above in Example 1–C.

(D) 1 - [3 - (2 - hydroxymethyl-5-methylsulfinyl-3-indolyl)propyl]-4-cyclohexylmethylpiperidine is prepared by lithium aluminum hydride reduction in tetrahydrofuran of 1-[β-2-carbethoxy-5-methylsulfinyl - 3 - indolyl)propionyl]-4-cyclohexylmethylpiperidine using the procedure described above in Example 1–D.

Example 16

(A) 1 - [β - (2 - carbethoxy -5-methylsulfonyl-3-indolyl)propionyl]-4-cyclohexylmethylpiperidine is prepared by the reaction of 4-methylsulfonylbenzenediazonium chloride with 2-carbethoxycyclopentanone, conversion of the resulting ethyl adipate half ester α-keto-4-methylsulfonylphenylhydrazone to the corresponding 4-cyclohexylmethylpiperidide, and Fischer indole cyclization of the latter in the presence of mineral acid, all according to the procedure described above in Example 1–A.

(B) 1 - [β - (2 - carboxy-5-methylsulfonyl-3-indolyl)propionyl]-4-cyclohexylmethylpiperidine is prepared by alkaline saponification of 1-[β-(2-carbethoxy-5-methylsulfonyl-3-indolyl)propionyl] - 4 - cyclohexylmethylpiperidine using the procedure described above in Example 1–B.

(C) 1 - [β - (2 - carbamyl-5-methylsulfonyl-3-indolyl)propionyl]-4-cyclohexylmethylpiperidine is prepared by reaction of 1-[β-(2-carbethoxy-5-methylsulfonyl-3-indolyl)propionyl]-4-cyclohexylmethylpiperidine with anhydrous ammonia in ethanol using the procedure described above in Example 1–C.

(D) 1 - [3 - (2 - hydroxymethyl-5-methylsulfonyl-3-indolyl)propyl]-4-cyclohexylmethylpiperidine is prepared by lithium aluminum hydride reduction of 1-[β-2-carbethoxy-5-methylsulfonyl-3-indolyl)propionyl] - 4 - cyclohexylmethylpiperidine using the procedure described above in Example 1–D.

I claim:

1. A compound having the formula

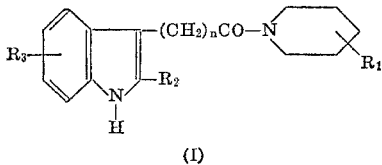

(I)

or the formula

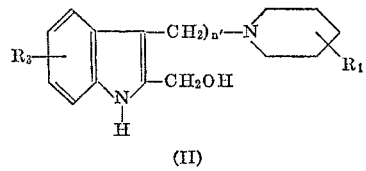

(II)

where $R_1$ is cycloalkyl-lower-alkyl containing from three to seven ring carbon atoms; $R_2$ is carbo-lower-alkoxy, carboxy, carbamyl, N-lower-alkylcarbamyl, N,N-di-lower-alkylcarbamyl, or alkali metal salts of compounds where $R_2$ is carboxy; $R_3$ is hydrogen or methylenedioxy or ethylenedioxy attached to adjacent carbon atoms, or one or two of the same or different members of the group consisting of halogen, lower-alkyl, loweralkoxy, lower-alkylmercapto, lower-alkylsulfinyl, lower-alkylsulfonyl, trifluoromethyl, benzyloxy, or hydroxy; $n$ is one of the integers 1 and 2; and $n'$ is one of the integers 2 and 3.

2. A compound of Formula I according to claim 1 where $R_2$ is carbo-lower-alkoxy, and $n$ is the integer 2.

3. A compound in Formula I according to claim 1 where $R_2$ is carboxy, and $n$ is the integer 2.

4. A compound for Formula I according to claim 1 where $R_2$ is N-lower-alkylcarbamyl, and $n$ is 2.

5. A compound of Formula II according to claim 1 where $n'$ is the integer 3.

6. 1 - [β-(2-carbethoxy-5-methoxy - 3 - indolyl)propionyl]-2-cyclohexylmethylpiperidine according to claim 2 where $R_1$ is 2-cyclohexylmethyl; $R_2$ is carbethoxy; and $R_3$ is 5-methoxy.

7. 1 - [β - (2 - carbomethoxy-3-indolyl)propionyl]-4-cyclohexylmethylpiperidine according to claim 2 where $R_1$ is 4-cyclohexylmethyl; $R_2$ is carbomethoxy; and $R_3$ is hydrogen.

8. 1 - [β - (2 - carbethoxy-5,7-difluoro-3-indolyl)-propionyl]-2-cyclohexylmethylpiperidine according to claim 2 where $R_1$ is 2-cyclohexylmethyl; $R_2$ is carbethoxy; and $R_3$ is 5,7-difluoro.

9. 1 - [β - (2 - carbomethoxy-5-methoxy-3-indolyl)propionyl] - 4 - cyclohexylmethylpiperidine according to claim 2 where $R_1$ is 4-cyclohexylmethyl; $R_2$ is carbomethoxy; and $R_4$ is 5-methoxy.

10. 1 - [β - (2 - carbomethoxy-5-fluoro-3-indolyl(propionyl]-4-cyclohexylmethylpiperidine according to claim 2 where $R_1$ is 4-cyclohexylmethyl; $R_2$ is carbomethoxy; and $R_3$ is 5-fluoro.

11. 1 - [β - (2 - carboxy-5-methoxy-3-indolyl) propionyl]-2-cyclohexylmethylpiperidine according to claim 3 where $R_1$ is 2-cyclohexylmethyl; and $R_3$ is 5-methoxy.

12. 1 - {β - [2-(N-methylcarbamyl)-5-methoxy-3-indolyl] - propionyl}-2-cyclohexylmethylpiperidine according to claim 4 where $R_1$ is 2-cyclohexylmethyl; $R_2$ is N-methylcarbamyl; and $R_3$ is 5-methoxy.

13. 1 - {β - [2 - (N-methylcarbamyl)-3-indolyl]propionyl}-4-cyclohexylmethylpiperidine according to claim 4 where $R_1$ is 4-cyclohexylmethyl; $R_2$ is N-methylcarbamyl; and $R_3$ is hydrogen.

14. 1 - {β - [2 - (N - methylcarbamyl)-5,7-difluoro-3-indolyl]propiony}-2-cyclohexylmethylpiperidine according to claim 4 where $R_1$ is 2-cyclohexylmethyl; $R_2$ is N-methylcarbamyl; and $R_3$ is 5,7-difluoro.

15. 1 - [3 - (2 - hydroxymethyl-5-methoxy-3-indolyl)propyl]-2-cyclohexylmethylpiperidine according to claim 5 where $R_1$ is 2-cyclohexylmethyl; and $R_3$ is 5-methoxy.

16. 1 - [3 - (2 - hydroxymethyl-3-indolyl)propyl]-4-cyclohexylmethylpiperidine according to claim 5 where $R_1$ is 4-cyclohexylmethyl; and $R_3$ is hydrogen.

17. 1 - [3 - (2 - hydroxymethyl-5-methoxy-3-indolyl) propyl]-4-cyclohexylmethylpiperdine according to claim 5 where $R_1$ is 4-cyclohexylmethyl; and $R_3$ is 5-methoxy.

References Cited

UNITED STATES PATENTS

| | | | |
|---|---|---|---|
| 3,183,235 | 5/1965 | Zenitz | 260—294 |
| 3,215,699 | 11/1965 | Shavel et al. | 260—294.7 |

HENRY R. JILES, Primary Examiner

G. T. TODD, Assistant Examiner

U.S. Cl. X.R.

269—293.4, 294.3, 294.7, 326.12, 326.13, 471; 424—267

PO-1050
(5/69)

UNITED STATES PATENT OFFICE
CERTIFICATE OF CORRECTION

Patent No. 3,578,669    Dated May 11, 1971

Inventor(s) Bernard L. Zenitz

It is certified that error appears in the above-identified patent and that said Letters Patent are hereby corrected as shown below:

Column 3, line 56, "demonstrate" should read --demonstrated--.

Column 4, line 36, "1-[β-(2carbethoxy-5-methoxy..." should read --1-[β-(2-carbethoxy-5-methoxy...--.

Column 5, line 69, "2-cyclohexylmethylpiperidine" should read --2-cyclohexylmethylpiperidide--.

Column 6, line 3, "...-3-indoyl]" should read --...-3-indolyl]--; lines 20-21, "acetate/hexance" should read --acetate/hexane--; lines 28-29, "...propionyl-2-" should read --...propionyl]-2---; line 57, "ofthe" should read --of the--; line 65, "1-β-[2-N..." should read --1-β-[2-(N...--.

Column 7, line 20, "...(N-methylcarbamy)" should read --...(N-methylcarbamyl)--; line 64, delete "in ... 5,6-methyl-".

Column 8, line 65, "...)proponyl]" should read --...propionyl]--.

Column 9, line 4, "1-[]0-(2-..." should read --1-[β-(2-...--.

Column 10, line 64, "1-[β-2-..." should read --1-[β-(2-...--; line 71, "indolyl propyl]" should read --indolyl)propyl]--.

Column 11, line 26, "1-[β-2-..." should read --1-[β-(2-...--; line 52, "1-[β-2-..." should read --1-[β-(2-...--.

Claim 9, column 12, line 33, "$R_4$" should read --$R_3$--.

Signed and sealed this 11th day of January 1972.

(SEAL)
Attest:

EDWARD M. FLETCHER, JR.    ROBERT GOTTSCHALK
Attesting Officer          Acting Commissioner of Patents